United States Patent Office 3,346,561
Patented Oct. 10, 1967

3,346,561
PYRIMIDINE 3-DEOXYNUCLEOSIDES
George E. Boxer, Westfield, and Ruth F. Nutt, Cranford, N.J., assignors to Merck & Co., Inc., Rahway, N.J., a corporation of New Jersey
No Drawing. Filed Oct. 24, 1965, Ser. No. 505,029
15 Claims. (Cl. 260—211.5)

ABSTRACT OF THE DISCLOSURE

Novel $\alpha$ and $\beta$-anomers of 1-(3-deoxy-D-ribofuranosyl)-pyrimidines which are substitued in the 4-position of the pyrimidine ring by alkoxy, hydroxy or amino groups and in the 5-position by alkoxy, hydroxy, alkyl or halogen are prepared by treating an acyl blocked 3-deoxyribofuranosyl halide with a 2,4-dialkoxypyrimidine, followed by solvolysis.

---

This application relates to novel and useful nucleosides and to the method for preparing these nucleosides. More particularly, the present invention relates to novel nucleosides that are useful in their own right and are also useful in the preparation of other more complicated nucleosides and nucleotides. Specifically, the present invention relates to novel substituted pyrimidine nucleosides and to the method of preparing these nucleosides. These nucleosides are $\alpha$ and $\beta$ anomers of 1-(3-deoxy-D-ribofuranosyl)-pyrimidines.

The novel compounds of the present invention may be represented by the following structural formulae:

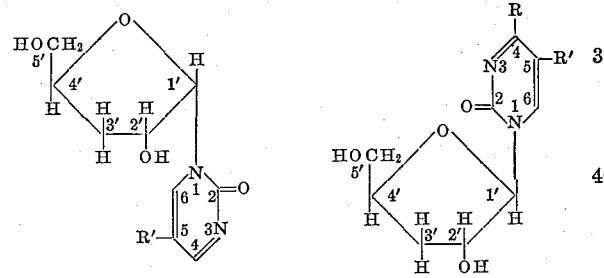

wherein R and R' may be the same or different, alkoxy, hydroxy, amino, or substituted amino, and in addition R' may also be hydrogen, alkyl, or halogen. However, R' cannot be hydrogen when R is hydroxy.

The object of the present invention is to provide novel pryimidine 3'-deoxynucleosides.

Another object of the present invention is to provide novel pyrimidine 3'-deoxynucleosides which may be reacted to form a variety of different 3'-deoxynucleoside and nucleotide compounds. When used as intermediates, the compounds of the present invention may be utilized in the preparation of various 3'-deoxynucleotides by their reaction with phosphorus compounds. These nucleotides may be useful in the study of nucleic acid metabolism.

An additional object of the present invention is to provide a novel process for the preparation of pyrimidine 3'-deoxynucleosides.

A further object of the present invention is to provide new novel nucleoside compounds that demonstrate valuable antibacterial activity.

A still further object of the present invention is to provide an over-all process for the convenient conversion of a 3'-deoxy ribo-sugar to a substituted pyrimidine 3'-deoxyribofuranoside.

Other additional objects of the present invention will become apparent to those skilled in the art by reading the following specification.

Typical of the R and R' groups which may be the same or different in the compounds of the present invention are lower alkoxy radicals such as methoxy, ethoxy and propoxy; hydroxy; amino and lower alkyl substituted amino methylamino, dimethylamino, ethylamino, diethylamino, propylamino and dipropylamino. In addition R' may also be hydrogen; a lower alkyl radical such as methyl, ethyl and propyl, or a halogen such as chlorine, bromine, iodine and fluorine.

Both $\alpha$ and $\beta$ anomers of the compounds of the present invention are prepared by treating a 3-deoxyribofuranosyl halide with a 2,4-dialkoxy pyrimidine followed by solvolysis. The reaction should be carried out in a temperature range of from about 5° to about 120° C. and preferably between about 25° C. to about 60° C. for a period of time to complete the reaction. This is usually from about several hours to several days and it should be noted that the higher the reaction temperature range, the quicker the reaction will go to completion. The reaction depicting the preparation of the present invention is illustrated by the following flow diagram:

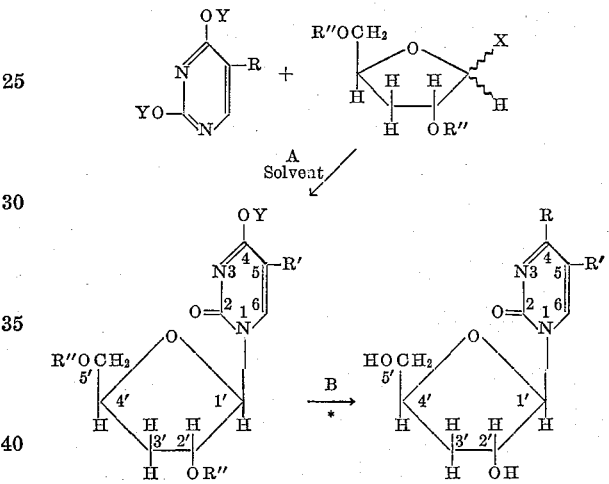

\* Comprises an acidic or a basic catalyst and a solvent.

wherein R and R' are as previously defined, X is a halogen in either the $\alpha$ or $\beta$ configuration or a combination of both, Y is lower alkyl, R'' is acyl or substituted acyl. Examples of acyl are acetyl, propionyl, butyroyl, benzoyl and naphthanoyl. Examples of substituted acyl are toluoyl, xyloyl, and nitrobenzoyl. Solvents may be $C_{1-4}$ alcohols.

In general, the process of the present invention involves reacting a 2,4-dialkoxy pyrimidine with an acyl blocked 3-deoxy-D-ribofuranosyl halide to form a 1-(acylated 3'-deoxy-D-ribofuranosyl)-pyrimidone. These intermediate compounds are then solvolized to form the compounds of the present invention. More specifically, the process of the present invention involves, in Step A, the reaction of a 2,4-dialkoxy pyrimidone with an acyl 3-deoxy-D-ribofuranosyl halide in essentially stoichiometric proportions at a temperature range of about 5° C. to about 120° C. and preferably between about 25° C. to about 60° C. until reaction is complete. In this step the reaction is carried out in an appropriate solvent. The selection of the solvent is not important as long as it is an inert solvent. Examples of such solvents are methylene chloride, benzene, diethyl ether, dibutyl ether, dioxane, tetrahydrofuran, cyclohexane, and the like. The preferred solvent is methylene chloride. The reaction is normally complete in from a few hours to several days, depending on the selection of the reaction temperature. After obtaining the reaction product from Step A, this compound is then solvolized in Step B in the presence of an acidic and/or basic catalyst in an appropriate solvent, in about the same temperature range as in Step A and in a reaction time of from about a few minutes to several days depending on the nature of the catalyst and the solvents used. Examples of acidic and basic catalysts are any strong mineral acids such as hydrochloric, hydrobromic, sulfuric, and the like, and bases such as alkali and alkaline earth metals and the corresponding alkoxides, solutions of ammonia, amines, and substituted amines. It has been found that acidic catalysts take longer to complete the reaction than basic catalysts. The preferred solvent is methanol.

Representative of the novel compounds obtained by the method of the present invention, but not limited to these compounds, are the $\alpha$ and $\beta$ forms of 1-(3-deoxy-D-ribofuranosyl)-4-methoxy-2(1-H)-pyrimidone;
1-(3-deoxy-D-ribofuranosyl)-4-ethoxy-2(1-H)-pyrimidone;
1-(3-deoxy-D-ribofuranosyl)-4-propoxy-2(1-H)-pyrimidone;
1-(3-deoxy-D-ribofuranosyl)-4-hydroxy-5-chloro-2(1-H)-pyrimidone;
1-(3-deoxy-D-ribofuranosyl)-4-hydroxy-5-bromo-2(1-H)-pyrimidone;
1-(3-deoxy-D-ribofuranosyl)-4-hydroxy-5-iodo-2(1-H)-pyrimidone;
1-(3-deoxy-D-ribofuranosyl)-4-hydroxy-5-fluoro-2(1-H)-pyrimidone;
1-(3-deoxy-D-ribofuranosyl)-4-amino-2(1-H)-pyrimidone;
1-(3-deoxy-D-ribofuranosyl)-4-methylamino-2(1-H)-pyrimidone;
1-(3-deoxy-D-ribofuranosyl)-4-dimethylamino-2(1-H)-pyrimidone;
1-(3-deoxy-D-ribofuranosyl)-4-diethylamino-2(1-H)-pyrimidone;
1-(3-deoxy-D-ribofuranosyl)-4-propylamino-2(1-H)-pyrimidone;
1-(3-deoxy-D-ribofuranosyl)-4,5-dimethoxy-2(1-H)-pyrimidone;
1-(3-deoxy-D-ribofuranosyl)-4-methoxy-5-ethoxy-2(1-H)-pyrimidone;
1-(3-deoxy-D-ribofuranosyl)-4-methoxy-5-chloro-2(1-H)-pyrimidone;
1-(3-deoxy-D-ribofuranosyl)-4-methoxy-5-fluoro-2(1-H)-pyrimidone;
1-(3-deoxy-D-ribofuranosyl)-4-hydroxy-5-methyl-2(1-H)-pyrimidone;
1-(3-deoxy-D-ribofuranosyl)-4-hydroxy-5-ethyl-2(1-H)-pyrimidone;
1-(3-deoxy-D-ribofuranosyl)-4-amino-5-methyl-2(1-H)-pyrimidone;
1-(3-deoxy-D-ribofuranosyl)-4-amino-5-ethyl-2(1-H)-pyrimidone;
1-(3-deoxy-D-ribofuranosyl)-4-methoxy-5-methyl-2(1-H)-pyrimidone;
1-(3-deoxy-D-ribofuranosyl)-4-ethoxy-5-methyl-2(1-H)-pyrimidone;
1-(3-deoxy-D-ribofuranosyl)-4-methoxy-5-ethyl-2(1-H)-pyrimidone;
1-(3-deoxy-D-ribofuranosyl)-4-ethoxy-5-ethyl-2(1-H)-pyrimidone;
1-(3-deoxy-D-ribofuranosyl)-4-hydroxy-5-bromo-2(1-H)-pyrimidone;
1-(3-deoxy-D-ribofuranosyl)-4-hydroxy-5-fluoro-2(1-H)-pyrimidone;
1-(3-deoxy-D-ribofuranosyl)-4-amino-5-bromo-2-(1-H)-pyrimidone; and
1-(3-deoxy-D-ribofuranosyl)-4-amino-5-fluoro-2(1-H)-pyrimidone.

The following examples illustrate the method of carrying out the present invention, but it is to be understood that they are given for the purpose of illustration and not of limitation.

EXAMPLE I

*1-(2,5-di-O-benzoyl-3-deoxy-$\beta$-D-ribofuranosyl)-4-methoxy-5-fluoro-2(1-H)-pyrimidone*

A solution of 2,5-di-O-benzoyl-3-deoxy-$\beta$-D-ribofuranosyl bromide (prepared from 2 g. (5.61 mmoles) of methyl 2,5-di-O-benzoyl-3-deoxy-$\beta$-D-ribofuranoside) in 20 ml. of dry methylene chloride is treated with a stirred solution of 1.9 g. (12.0 mmoles) of 2,4-dimethoxy-5-fluoropyrimidine in 80 ml. of dry methylene chloride. Stirring at 25° C. is continued for 80 hours. The reaction is followed by TLC (thin-layer chromatography) on alumina in ethyl acetate-methylene chloride (1:4). After 80 hours no further changes in the composition of the reaction solution are noted.

The reaction solution is concentrated at reduced pressure. The residual oil (5.7 g.) is dissolved in 150 ml. of ether, filtered, and extracted with three 30 ml. portions of cold 5% hydrochloric acid, one 10 ml. portion of 10% potassium bicarbonate, and one 20 ml. portion of water. The dried (MgSO$_4$) ether solution is concentrated at reduced pressure. TLC and IR spectrum of the residual oil (3.7 g.) shows that much of the excess starting pyrimidine has been removed by the acid wash. The oil, in benzene, is chromatographed on a short alumina column. This material is crystallized from 20 ml. of benzene and 5 ml. of petroleum ether. 1-(2,5-di-O-benzoyl-3-deoxy-$\beta$-D-ribofuranosyl) - 4 - methoxy-5-fluoro-2(1-H)-pyrimidone (1.03 g., 39%, M.P. 148–150° C.) is obtained. TLC on alumina in chloroform shows a single spot (iodine vapor) of R$_f$ 0.80. $[\alpha]_{578}+27°$, $[\alpha]_D+24°$ (c. 0.64 in CHCl$_3$).

$\lambda_{\text{inf.}}^{\text{EtOH}}$ 287 m$\mu$ ($\epsilon$ 6,190), $\lambda_{\text{max.}}^{\text{EtOH}}$ 282.5 m$\mu$ ($\epsilon$ 7,080), 277.5 m$\mu$ ($\epsilon$ 6,700), 229 m$\mu$ ($\epsilon$ 31,100)

There is no marked spectral shift in 0.1 N sodium hydroxide.

*Analysis.*—Calc. for C$_{24}$H$_{21}$FN$_2$O$_7$ (468.4): C, 61.53; H, 4.52; N, 5.98. Found: C, 61.67; H, 4.34; N, 6.00.

EXAMPLE II

*5-fluoro-3'-deoxyuridine*

A solution of 234 mg. (0.5 mmole) of 1-(2,5-di-O-benzoyl - 3 - deoxy-$\beta$-D-ribofuranosyl)-4-methoxy - 5-fluoro-2(1-H)-pyrimidone, prepared as in Example I, in 5 ml. of methanol and 0.6 ml. of 2.5 N sodium hydroxide (1.5 mmoles) is heated at 60° C. for 1.5 hours. The solution is concentrated to dryness and the residue (428 mg.) is dissolved in 10 ml. of water. The solution is treated with 1 g. of damp Dowex 50 (H$^+$) resin and stirred for 10 minutes during which time benzoic acid precipitates. The resin and benzoic acid are removed and washed with water. The filtrate and washings are in turn washed with three 15-ml. portions of ether and concentrated to dryness at reduced pressure. Ethanol is distilled from the residue three times to remove excess water. The residue is dissolved in ethanol and treated with ether. A small amount of solid (22.5 mg., M.P. 145–203° C.) precipitates and is filtered. The solvent is distilled from the filtrate and the residue is triturated with ether to give 80 mg. (65%) of 5-fluoro-3'-deoxyuridine, M.P. 166.5–167.5° C. The melting point is not changed after drying at 78° C. for 3 hours for analysis. TLC on cellulose in water shows one UV absorbing spot of R$_f$ 0.82.

$\lambda_{\text{max.}}^{\text{MeOH}}$ 271 m$\mu$ ($\epsilon$ 8,000), $\lambda_{\text{max.}}^{\text{MeOH}}$ (0.1 N NaOH) 268 m$\mu$ ($\epsilon$ 7,450); $\lambda_{\text{max.}}^{\text{MeOH-H}_2\text{O}(1:1)}$ 271 m$\mu$ ($\epsilon$ 8,950); $\lambda_{\text{max.}}^{\text{MeOH-H}_2\text{O}(1:1)}$ (0.1 N NaOH) 271 m$\mu$ ($\epsilon$ 7,060). $\lambda_{\text{max.}}^{\text{Nujol}}$ 5.85, $\lambda_{\text{shld.}}^{\text{Nujol}}$ 5.92, 605 (C=O). $[\alpha]_D+30°$, $[\alpha]_{578}+33°$ (C 1.1 in H$_2$O)

*Analysis.*—Calc. for C$_9$H$_{11}$FN$_2$O$_5$ (246.2): C, 43.90; H, 4.50; N, 11.38. Found: C, 43.69; H, 4.69; N, 11.05.

EXAMPLE III

3'-deoxy-5-fluorocytidine

A mixture of 94 mg. (0.2 mmole) of 1-(2,5-di-O-benzoyl-3-deoxy-β-D-ribofuranosyl)-4-methoxy - 5 - fluoro-2(1-H)-pyrimidone, prepared as in Example I, and 1.4 ml. of ethanol, saturated with ammonia at 0° C., is heated at 100° C. in a sealed tube for 12 hours. The tube is opened and the solution is filtered. The filtrate is concentrated to dryness at reduced pressure. A solid (benzamide) separates when 3 ml. of water are added to the residue (104 mg.). The mixture is washed with three 2-ml. portions of chloroform and the water layer is concentrated to dryness at reduced pressure. The residue (52 mg.) is crystallized by dissolving it in 1 ml. of water-ethanol and adding 0.2 ml. of 5 N sulfuric acid. The mixture is concentrated to dryness at reduced pressure. Two portions of ethanol are distilled from the residue which is then crystallized from 2 ml. of ethanol by adding 5 ml. of ether. 3'-deoxy-5-fluorocytidine hydrogen sulfate (46.4 mg., 68%) melting at 175–178° C. is obtained.

$[\alpha]_D +41°$, $[\alpha]_{578} +45°$ (c., 0.51 in $H_2O$) $\lambda_{max.}^{H_2O}$ 282 m$\mu$ ($\epsilon$ 8,230), 235 m$\mu$ ($\epsilon$ 7,960); $\lambda_{max.}^{H_2O}$ (pH 13) 282 m$\mu$ ($\epsilon$ 8,230); $\lambda_{max.}^{H_2O}$ (pH 1) 292.5 m$\mu$ ($\epsilon$ 11,500)

*Analysis.*—Calc. for $C_9H_{12}FN_3O_4 \cdot H_2SO_4$ (343.3): C, 31.50; H, 4.11; N, 12.24; S, 9.34. Found: C, 31.23; H, 4.18; N, 12.16; S, 9.94.

EXAMPLE IV

1-(2,5-di-O-p-nitrobenzoyl-3-deoxy-β-D - ribofuranosyl)-4 methoxy-5-methyl-2(1-H)-pyrimidone and 1-(2,5-di-O-p-nitrobenzoyl-3-deoxy-α-D-ribofuranosyl) - 4 - methoxy-5-methyl-2-(1-H)-pyrimidone A solution of 4.47 g. (28.8 mmoles) of 2,4-dimethoxy-5-methylpyrimidine in 240 ml. of dry methylene chloride is stirred and treated with 6.67 g. (13.5 mmoles) of 2,5-di-O-p-nitrobenzoyl-3-deoxy-β-D - ribofuranosylbromide. The course of the reaction is followed by TLC on alumina in chloroform. After 72 hours the reaction mixture is concentrated to a residual solid (10.6 g.). Leaching the residue with ether removes 3.6 g. of starting pyridine contaminated with a small amount of the β-anomer of the desired product. The ether insoluble solid (7.0 g.) is dissolved in chloroform and chromatographed on 70 g. of alumina. After elution of a small amount of unreacted pyrimidine, a fraction containing 980 mg. of almost pure β-anomer is obtained from the column. Recrystallization of this material from benzene-petroleum ether gives 510 mg. of product, M.P. 163–167° C. A second recrystallization from ethyl acetate-petroleum ether gives 420 mg. of purified 1 - (2,5-di-O-p-nitrobenzoyl-3-deoxy-β-D-ribofuranosyl)-4-methoxy-5-methyl-2(1-H) - pyrimidone, M.P. 163–167° C.

$\lambda_{max.}^{MeOH}$ 261 m$\mu$ ($\epsilon$ 28,200)

*Analysis.*—Calc. for $C_{25}H_{22}N_4O_{11}$: C, 54.15; H, 4.00; N, 10.11. Found: C, 54.16; H, 4.38; N, 10.20.

Further elution of the column with chloroform gives two additional fractions (1.89 g.) of predominantly α-anomer but containing some of the β-anomer. The next column fraction yields 520 mg. of almost pure α-anomer. Recrystallization of this material from methanol gives 500 mg. of product, M.P. 217–218° C. A second recrystallization from chloroform-methanol gives 440 mg. of 1 - (2,5-di-O-p-nitrobenzoyl-3-deoxy-α-D-ribofuranosyl)-4-methoxy-5-methyl-2(1-H)-pyrimidone, M.P. 218–219° C.

$\lambda_{max.}^{MeOH}$ 260 m$\mu$ ($\epsilon$ 26,200)

*Analysis.*—Found: C, 54.09; H, 4.08; N, 9.90.

Several recrystallizations of the α-rich fractions give an additional 710 mg. of the α-anomer, M.P. 218–220° C.

All remaining fractions and the mother liquors from the crystallizations are combined an rechromatographed on a short alumina column in chloroform. Crystallization of selected fractions gives additional amounts of the pure α and β anomers. A total of 1.3 g. (18%) of α- and 2.07 g. (28%) of β-1-(2,5-di-O-p-nitrobenzoyl-3-deoxy-D-ribofuranosyl)-4-methoxy-5-methyl-2(1-H)-pyrimidone is obtained.

EXAMPLE V

Preparation of 1-(3-deoxy-β-D-ribofuranosyl)-5-methylcytosine

A mixture of 400 mg. (0.72 mmoles) of 1-(2,5-di-O-p-nitrobenzoyl-3-deoxy-β-D-ribofuranosyl)-4-methoxy - 5-methyl-2-(1-H)-pyrimidone, prepared as in Example IV, and 5 ml. of methanol, saturated with ammonia at 0°, is heated at 100° C. in a sealed tube for 16 hours. The reaction solution is concentrated to dryness and the residue is treated with 25 ml. of water. The insoluble p-nitrobenzamide is removed and washed with water. The filtrate and washings are extracted with three 20-ml. portions of chloroform and concentrated to dryness. The residue is crystallized three times from methanol-ether to give 90 mg. (52%) of 1-(3-deoxy-β-D-ribofuranosyl)-5-methylcytosine. The prepared compound has the following physical characteristics: M.P. 223–226° C., specific rotation $[\alpha]_D +30°$, $[\alpha]_{578} +32°$ (c, 0.59 in $H_2O$) $\lambda_{max.}^{pH 1}$ 288 m$\mu$ ($\epsilon$ 12,500), 214 (10,950); $\lambda_{max.}^{pH 7}$ 278 m$\mu$ ($\epsilon$ 8,620), 225 (inf.)(8,760), 212 (12,650); $\lambda_{max.}^{pH 11}$ 278 m$\mu$ ($\epsilon$ 8,620), 225 (inf.)(8,830), 212.5 (12,650)

Thin layer chromatography on cellulose in water shows one zone of $R_f$ 0.76.

*Analysis.*—Calc. for $C_{10}H_{15}N_3O_4$: C, 49.78; H, 6.27; N, 17.42. Found: C, 49.56; H, 6.27; N, 17.42.

EXAMPLE VI

Preparation of 1-(3-deoxy-α-D-ribofuranosyl)-4-methoxy-5-methyl-2(1-H)-pyrimidone A suspension of 960 mg. (1.73 mmoles) of 2,5-di-O-p-nitrobenzoyl-3-deoxy-α-D-ribofuranosyl) - 4 - methoxy-5-methyl-2(1-H)-pyrimidone prepared as in Example IV in 21 ml. of dry methanol is treated with a solution of 60 mg. (2.6 mmoles) of sodium in 3 ml. of methanol. The solution is refluxed for 1.25 hours, concentrated to dryness, and 30 ml. of water is added. Precipitated methyl p-nitrobenzoate is removed and washed with water. The filtrate and washings are extracted with 3 portions of ether and concentrated to dryness. Recrystallization of the residue from methanol by adding ether gives a total of 292 mg. (66%) of 1-(3-deoxy-α-D-ribofuranosyl)-4-methoxy-5-methyl-2(1-H)-pyrimidone. The prepared compound has the following physical characteristics: M.P. 185–187° C. Thin layer chromatography on cellulose in water shows one spot of $R_f$ 0.9. $[\alpha]_D -157°$; $[a]_{578} -166°$ (c., 0.99% in $H_2O$).

$\lambda_{max.}^{H_2O}$ 282, 204 m$\mu$ ($\epsilon$ 6,860; 18,900), $\lambda_{inf.}^{H_2O}$ 215 m$\mu$ ($\epsilon$ 12,800)

*Analysis.*—Calc. for $C_{11}H_{16}N_2O_5$: C, 51.56; H, 6.29; N, 10.93. Found: C, 51.42; H, 6.07; N, 11.04.

EXAMPLE VII

Preparation of 1-(3-deoxy-β-D-ribofuranosyl)-4-methoxy-5-methyl-2(1-H)-pyrimidone A solution of 1.54 g. (2.78 mmoles) of 1-(2,5-di-O-p-nitrobenzoyl - 3 - deoxy - β - D ribofuranosyl) - 4 - methoxy-5 - methyl - 2(1 - H) - pyrimidone prepared as in Example IV in 34 ml. of dry methanol is treated with a solution of 100 mg. (4.35 mmoles) of sodium in 3 ml. of dry methanol and the mixture is refluxed for one hour. The solvent is removed at reduced pressure and the solid residue is treated with 50 ml. of water. Methyl p-nitrobenzoate is filtered and washed with water. The filtrate is treated with 15 g. (moist) of Dowex 50 W (H+) resin to remove sodium ion. The pH of the solution drops from 11.6 to 3.3 in five minutes. The resin and precipitated p-nitrobenzoic acid is filtered and washed well with water. The combined filtrate and washings are washed with three 100-ml. portions of ether and the water layer is concentrated to dryness at reduced pressure. Two recrystallizations of the residual solid (640 mg.; M.P. 193–196°) from methanol gives 258 mg. of 1-(3-deoxy-β-D-ribofuranosyl)-4-methoxy-5-methyl-2(1-H)-pyrimidone, M.P. 196–198°. $[\alpha]_D + 25°$, $[\alpha]_{578} + 27°$ (c., 0.765% in $H_2O$).

$\lambda^{H_2O}_{max.}$ 280, 204 m$\mu$ ($\epsilon$ 7,570; 21,900), $\lambda^{H_2O}_{inf.}$ 215 m$\mu$ ($\epsilon$ 13,800)

Thin layer chromatography on cellulose in water shows one ultraviolet absorbing zone at $R_f$ 0.88.

Analysis.—Calc. for $C_{11}H_{16}N_2O_5$: C, 51.56; H, 6.29; N, 10.93. Found: C, 51.26; H, 6.33; N, 10.96.

EXAMPLE VIII

*Preparation of 1-(3-deoxy-α-D-ribofuranosyl)-5-methyluracil*

A solution of 279 mg. (1.09 mmoles) of 1-(3-deoxy-α-D-ribofuranosyl)-4-methoxy-5-methyl-2(1-H)-pyrimidone prepared in Example VI in 10 ml. of dry methanol is treated with 1 ml. of 30% hydrogen chloride in methanol. The solution is kept at 25° for 6 days after which time no further changes in the ultraviolet absorption spectrum are observed. The solution is concentrated to dryness and crystallization of the residue from methanol by adding ether gives 200 mg. (76%) of 1-(3-deoxy-α-D-ribofuranosyl)-5-methyluracil. The prepared compound has the following physical characteristic: M.P. 188–191° C. Thin layer chromatography on cellulose in water shows one spot of $R_f$ 0.86. $[\alpha]_D - 112°$; $[\alpha]_{578} - 118°$ (c., 0.17% in water).

$\lambda^{pH1}_{max.}$ 269 m$\mu$ ($\epsilon$ 9,930), $\lambda^{pH7}_{max.}$ 269 m$\mu$ ($\epsilon$ 9,960), 205 m$\mu$ ($\epsilon$ 9,190), $\lambda^{pH13}_{max.}$ 269 m$\mu$ ($\epsilon$ 7,610), $\lambda^{pH13}_{inf.}$ 218 m$\mu$ ($\epsilon$ 11,000)

Analysis.—Calc. for $C_{10}H_{14}N_2O_5$: C, 49.58; H, 5.83; N, 11.57. Found: C, 49.72; H, 6.07; N, 11.69.

EXAMPLE IX

*Preparation of 1-(3-deoxy-β-D-ribofuranosyl)-5-methyluracil*

A suspension of 395 mg. (1.54 mmoles) of 1-(3-deoxy-β-D-ribofuranosyl)-4-methoxy-5-methyl-2(1-H)-pyrimidone prepared as in Example VII in 15 ml. of methanol is treated with 1.5 ml. of 30.6% (w./w.) hydrogen chloride in methanol and the solution is kept at 25°. After six days no further change in the ultraviolet absorption spectrum is observed. The solution is concentrated to dryness at reduced pressure. One portion of methanol and three successive portions of benzene are distilled from the residue at reduced pressure. The residue when crystallized from 1 ml. of methanol and 3 ml. of ether gives 300 mg. (81%) of 1-(3-deoxy-β-D-ribofuranosyl)-5-methyluracil which after being dried at reduced pressure and 78° melts at 96–100°, resolidifies and remelts at 155–157°. For analysis a sample is twice recrystallized from methanol-ether and dried to constant weight at 56°. $[\alpha]_D + 1.4°$, $[\alpha]_{578} + 2.3°$ (c., 0.44 in $H_2O$).

$\lambda^{H_2O}_{max.}$ 269 m$\mu$ ($\epsilon$ 9,450), $\lambda^{pH1}_{max.}$ 269 m$\mu$ ($\epsilon$ 9,450), $\lambda^{pH13}_{max.}$ 268 m$\mu$ ($\epsilon$ 7,000)

Analysis.—Calc. for $C_{10}H_{14}N_2O_5$: C, 49.58; H, 5.83; N, 11.57. Found: C, 49.49; H, 5.84; N, 11.22.

EXAMPLE X

*Preparation of 1-(2,5-di-O-p-nitrobenzoyl-3-deoxy-α-D-ribofuranosyl)-4-methoxy-2(1-H)-pyrimidone and 1-(2,5-di-O-p-nitrobenzoyl-3-deoxy-β-D-ribofuranosyl)-4-methoxy-2(1-H)-pyrimidone*

A solution of 1.51 g. (10.8 mmoles) of 2,4-dimethoxypyrimidine in 60 ml. of dry methylene dichloride is treated with a solution of 2.5 g. (5.05 mmoles) of 2,5-di-O-p-nitrobenzoyl-3-deoxy-β-D-ribofuranosyl bromide in 20 ml. of dry methylene chloride. The solution is stirred at 25° for five days, although thin layer chromatography on alumina in chloroform indicates very little change in composition after three days. The reaction solution is washed with two 25-ml. portions of 5% hydrochloric acid and with 25 ml. of 10% potassium bicarbonate and 10 ml. of saturated sodium chloride. The methylene chloride solution is concentrated at reduced pressure and the residual glass (2.9 g.) is chromatographed on a short column of 60 g. of alumina using chloroform as the solvent. Fractions are pooled on the basis of their behavior on thin layer chromatography. One portion (760 mg.) gives 500 mg. of solid, melting point 175–190°, from methanol. It is recrystallized from ethyl acetate-petroleum ether and 290 mg. (11%) of 1-(2,5-di-O-p-nitrobenzoyl-3-deoxy-β-D-ribofuranosyl)-4-methoxy-2(1-H)-pyrimidone, melting point 193–194°. Thin layer chromatography on alumina in chloroform shows one spot ($R_f$ 0.41) when treated with iodine vapor. $[\alpha]_D - 9.2°$ (c., 1.09 in $CHCl_3$).

$\lambda^{MeOH}_{max.}$ 262 m$\mu$ ($\epsilon$ 30,000)

Analysis.—Calc. for $C_{24}H_{20}N_4O_{11}$: C, 53.34; H, 3.73; N, 10.37. Found: C, 53.47; H, 4.02; N, 10.00.

From the filtrates and another column fraction, an additional 350 mg. (total yield 24%) of the same product (melting point 191–193°) is obtained after several recrystallizations.

A second major column fraction (1 g.) gives, after being recrystallized from benzene, 640 mg. (24%) of 1-(2,5-di-O-p-nitrobenzoyl-3-deoxy-α-D-ribofuranosyl)-4-methoxy-2(1-H)-pyrimidone, melting point 184–186°. Thin layer chromatography on alumina in chloroform shows only one spot ($R_f$ 0.32). $[\alpha]_D - 237°$, $[\alpha]_{578} - 252°$ (c., 1.02 in $CHCl_3$).

$\lambda^{MeOH}_{max.}$ 261 m$\mu$ ($\epsilon$ 28,400)

Analysis.—Calc. for $C_{24}H_{20}N_nO_{11}$: C, 53.34; H, 3.73; N, 10.37. Found: C, 53.3; H, 3.97; N, 10.31.

EXAMPLE XI

*Preparation of 1-(3-deoxy-α-D-ribofuranosyl)-4-methoxy-2(1-H)-pyrimidone*

A suspension of 760 mg. (1.4 mmoles) of 1-(2,5-di-O-p-nitrobenzoyl-3-deoxy-β-D-ribofuranosyl)-4-methoxy-2(1-H)-pyrimidone prepared as in Example X in 17 ml. of dry methanol is treated with a solution of 60 mg. (2.6 mmoles) of sodium in 3 ml. of dry methanol. The mixture is refluxed for one hour and the methanol is removed at reduced pressure. About 30 ml. of water is added to the residue and the insoluble methyl p-nitrobenzoate is filtered and washed with several portions of water. The filtrate and washings are combined and treated with 7 g. of moist Dowex 50 ($H^+$) resin. The resin is removed and washed well with water. The filtrate and washings are extracted with three portions of chloroform and the water layer is concentrated to dryness at reduced pressure. Three small portions of methanol are distilled from the residue to remove excess water. The dried residue (320 mg.) melts at 188–205°. Recrystallization of this material from 9 ml. of methanol gives 183 mg. of product, melting point 199–205°. A second crop (85 mg.) obtained from the filtrate melts at 165–185°. Recrystallization of the first crop from methanol gives 156 mg. (46%) of 1-(3-deoxy-α-D-ribofuranosyl)-4-methoxy-2(1-H)-pyrimidone, melting point 209–211°. $[\alpha]_D - 182°$; $[\alpha]_{578} - 194°$ (c., 0.263 in $H_2O$).

$\lambda^{H_2O}_{max.}$ 204, 275 m$\mu$ ($\epsilon$ 6,940; 17,900), $\lambda^{pH1}_{max.}$ 276, 210 m$\mu$ ($\epsilon$ 6,800; 11,500), $\lambda^{pH13}_{max.}$ 275 m$\mu$ ($\epsilon$ 6,960)

Thin layer chromatography on cellulose shows a single spot at $R_f$ 0.91 ($H_2O$).

Analysis.—Calc. for $C_{10}H_{14}N_2O_5$: C, 49.58; H, 5.83; N, 11.57. Found: C, 49.55; H, 5.80; N, 11.87.

EXAMPLE XII

Preparation of 1-(3-deoxy-β-D-ribofuranosyl)-4-methoxy-2(1-H)-pyrimidone

A suspension of 520 mg. (0.963 mmole) of 1-(2,5-di-O-p-nitrobenzoyl-β-D-ribofuranosyl)-4-methoxy-2-(1-H)-pyrimidone prepared as in Example X in 12 ml. of dry methanol is treated with a solution of 38 mg. (1.65 mmoles) of sodium in 3 ml. of dry methanol. The mixture is refluxed for one hour and concentrated to dryness at reduced pressure. About 20 ml. of water is added to the residue and the insoluble methyl p-nitrobenzoate is removed and washed well with water. The filtrate and washings are treated with 4 g. of wet Dowex 50W-X4 (H+) resin for 10 minutes. The resin is removed, washed with water, and the filtrate and washings are extracted with three 30-ml. portions of ether. The water layer is filtered and concentrated to dryness at reduced pressure. The residue (190 mg.) dissolved in methanol is filtered and the filtrate concentrated to about 2 ml. After being kept at 5° overnight, the solution gives 175 mg. (75%) of 1-(3-deoxy-β-D-ribofuranosyl)-4-methoxy-2(1-H)-pyrimidone, melting point 187–191°.

EXAMPLE XIII

Preparation of 1-(3-deoxy-α-D-ribofuranosyl)uracil

A suspension of 130 mg. (538 mmoles) of 1-(3-deoxy-α-D-ribofuranosyl)-4-methoxy-2(1-H)-pyrimidone prepared as in Example XI in 5 ml. of methanol is treated with 0.5 ml. of 31% hydrogen chloride in methanol and all of the solid dissolved immediately. The ultraviolet absorption spectrum of the reaction solution is checked periodically and no change can be observed after 93 hours. The solution is concentrated to dryness and the residue is freed of traces of hydrogen chloride by distilling off several portions of benzene and methanol at reduced pressure. The residue is crystallized from 0.3 ml. of methanol. The product (23.2 mg., melting point 126–127°) is removed and a second crop (56.2 mg., melting point 122.5–125.5°) is obtained from the filtrate by adding ether. Two recrystallizations of the combined crops from methanol by adding ether gives 32.2 mg. (27%) of 1-(3-deoxy-α-D-ribofuranosyl)uracil, melting point 125.5–126.5°.

Thin layer chromatography on cellulose in water shows one zone at $R_f$ 0.88 when sprayed with diluted potassium permanganate. On thin layer chromatography the α-anomer oxidizes much slower than the β-anomer with potassium permanganate solution. $[\alpha]_D$ —134°, $[\alpha]_{578}$ —141°, (c., 0.134 in $H_2O$).

$\lambda_{max.}^{pH7}$ 264, and 205 mμ ($\epsilon$ 10,500; 9,400), $\lambda_{max.}^{pH1}$ 263 and 205 mμ ($\epsilon$ 10,130; 8,900), $\lambda_{max.}^{pH13}$ 262.5 and 213 mμ ($\epsilon$ 7,880; 11,200)

Analysis.—Calc. for $C_9H_{12}N_2O_5$: C, 47.37; H, 5.30; N, 12.28. Found: C, 47.57; H, 5.22; N, 11.99.

EXAMPLE XIV

Preparation of 1-(3-deoxy-α-D-ribofuranosyl)cytosine

A solution of 300 mg. (0.56 mmole) of 1-(2,5-di-O-p-nitrobenzoyl-3-deoxy-α-D-ribofuranosyl)-4-methoxy-2(1-H)-pyrimidone prepared in Example X in 4 ml. of methanol, previously saturated with ammonia at 0°, is heated at 100° in a sealed tube overnight. The clear reaction solution is concentrated to dryness and 20 ml. of water is added. The insoluble p-nitrobenzamide is filtered and washed well with water. The filtrate and washings are combined and washed with two 50-ml. portions of ether. The water layer is concentrated to dryness (140 mg.). Thin layer chromatography on cellulose with water as the solvent shows a strong ultraviolet-absorbing zone of $R_f$ 0.75 (product) and a weak zone of $R_f$ 0.60 (p-nitrobenzamide). The solid is triturated with 1.5 ml. of methanol, filtered, and washed with two 0.5-ml. portions of methanol. A second crop is obtained from the filtrate and washings. The total recovery of 1-(3-deoxy-α-D-ribofuranosyl)cytosine, melting point 225–229°, is 103 mg. (82%). $[\alpha]_D$ —130°, $[\alpha]_{578}$ —141° (c., 0.73 in $H_2O$).

$\lambda_{max.}^{H_2O}$ 272.5, 198 mμ ($\epsilon$ 9,380; 26,000); $\lambda_{inf.}^{H_2O}$ 225 mμ ($\epsilon$ 8,300); $\lambda_{max.}^{pH1}$ 282.5, 214 mμ ($\epsilon$ 13,400; 10,000); $\lambda_{max.f}^{pH\ \epsilon}$ 273 mμ ($\epsilon$ 9,040); $\lambda_{inf.}^{pH13}$ 225 mμ ($\epsilon$ 8,200)

Analysis.—Calc. for $C_9H_{13}N_3O_4$: C, 47.57; H, 5.77; N, 18.49. Found: C, 47.39; H, 6.02; N, 18.31.

EXAMPLE XV

Preparation of 1-(3-deoxy-β-D-ribofuranosyl)cytosine

A solution of 300 mg. (0.556 mmole) of 1-(2,5-di-O-p-nitrobenzoyl-β-D-ribofuranosyl)-4-methoxy-2(1-H)pyrimidone prepared as in Example X in 36 ml. of methanol, previously saturated with ammonia at 0°, is heated at 100° in a sealed tube for 20 hours. The clear solution is concentrated to dryness, and 20 ml. of water is added to the residue. The insoluble p-nitrobenzamide is removed and washed well with water. The filtrate and washings are extracted with three portions of chloroform and concentrated to dryness at reduced pressure. Recrystallization of the residual solid from methanol-ether gives 99 mg. (80%) of 1-(3-deoxy-β-D-ribofuranosyl)cytosine, melting point 224–230°. Thin layer chromatography on cellulose in water shows one ultraviolet-absorbing spot on $R_f$ 0.75. $[a]_D$+54°, $[a]_{578}$+58° (c. 0.71 in $H_2O$).

$\lambda_{max.}^{H_2O}$ 272.5, 232.5, 215 mμ ($\epsilon$ 8,920; 6,780; 7,450); $\lambda_{max.}^{pH1}$ 280, 215 mμ ($\epsilon$ 13,100; 7,510); $\lambda_{max.}^{pH13}$ 272.5, 232.5 mμ ($\epsilon$ 8,920; 6,810)

Analysis.—Calc. for $C_9H_{13}N_3O_4$: C, 47.57; H, 5.77; N, 18.49. Found: C, 47.49; H, 5.80; N, 18.53.

As previously stated, the compounds of the present invention demonstrate valuable antibacterial activity against various strains of bacteria. The results of in vitro assay (agar diffusion method) are illustrated in the following table. This test using 7 mm. disks soaked with 1 mg./ml. aqueous solution of 5-fluoro-3'-deoxyuridine is similar to that described for penicillin in Analytical Microbiology, 1963, published by Academic Press, Inc., page 327, except that the test organisms were the various bacteria as indicated and the 10% horse serum agar medium was prepared with the following ingredients: sodium citrate, magnesium sulfate, ammonium sulfate, glucose, dipotassium hydrogen phosphate, potassium dihydrogen phosphate, and deionized water.

TABLE A

In vitro activity of 5-fluoro-3'-deoxyuridine

| Type of test organism: | Zone of inhibition, mm. |
|---|---|
| Escherichia coli | 25 |
| Bacillus sp. | 10 |
| Staphylococcus aureus | 13 |
| Xanthomonas vesicatoria | 17 |

Table B below shows the in vitro antibacterial activity of one of the compounds of the present invention at various levels of concentration.

TABLE B

*In vitro activity of 5-fluoro-3'-deoxyuridine*

| Type of Test Organism | Zone of Inhibition, mm. | | | |
|---|---|---|---|---|
| | 0.2 mg./ml. | 0.05 mg./ml. | 0.0125 mg./ml. | 0.0031 mg./ml. |
| *Proteus vulgaris* | 30 | 26 | 22 | 17 |
| *Klebsiella pneumoniae* | 26 | 22 | 17 | 12 |
| *Salmonella schottmuelleri* | 34 | 28 | 22 | 16 |
| *Staphylococcus aureus* | 32 | 28 | 25 | 21 |
| *Pseudomonas aeruginosa* | 31 | 26 | 18 | 11 |
| *Escherichia coli* | 29 | 24 | 18 | 13 |
| *Bacillus subtilis* | 40 | 37 | 33 | 27 |

As can be seen from the test data in Tables A and B above, 5-fluoro-3'-deoxyuridine, one of the compounds of the present invention, has a wide band of antibacterial activity against a number of different bacteria.

While specific embodiments of the present invention have been named and described, it will be apparent to those skilled in the art that changes may be made in the details shown without departing from the spirit of the present invention or the scope intended. Any departure from the above description which conforms to the present invention is intended to be included within the scope of the claims.

We claim:

1. Compounds of the formula

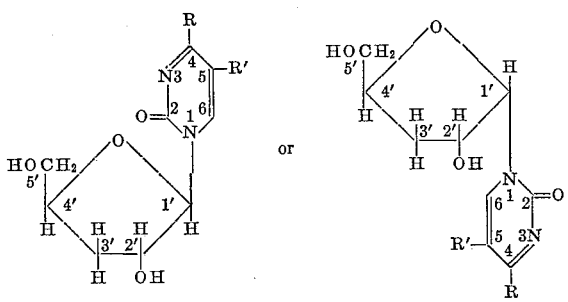

wherein R and R' may be the same or different lower alkoxy, hydroxy, amino, or lower alkyl substituted amino, in addition, R' may also be hydrogen, lower alkyl, or halogen; however R' cannot be hydrogen when R is hydroxy.

2. The compound of claim 1 wherein R is hydroxy.
3. The compound of claim 1 wherein R is amino.
4. The compound of claim 1 wherein R' is either fluoro, chloro, or bromo.
5. The compound of claim 1 wherein R' is lower alkyl.
6. 1 - (3 - deoxy - D - ribofuranosyl) - 4 - hydroxy - 5-fluoro-2(1-H)-pyrimidone.
7. 1-(3-deoxy-D-ribofuranosyl)cytosine.
8. 1 - (3 - deoxy - D - ribofuranosyl) - 4 - hydroxy-5-methyl-2(1-H)-pyrimidone.
9. 1 - (3 - deoxy - D - ribofuranosyl) - 4 - amino - 5-methyl-2(1-H)-pyrimidone.
10. 1 - (3 - deoxy - D - ribofuranosyl) - 4 - amino - 5-fluoro-2(1-H)-pyrimidone.

11. A method for producing a 1-(3-deoxy-D-ribofuranosyl)-substituted pyrimidine of the formula

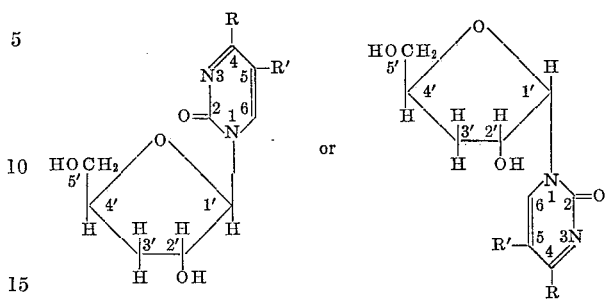

wherein R''' is lower alkanoyl, naphthoyl, benzoyl or subalkoxy, hydroxy, amino, or lower alkyl substituted amino, in addition, R' may also be hydrogen, lower alkyl, or halogen; however R' cannot be hydrogen when R is hydroxy, which comprises, in Step A, treating a compound of the formula

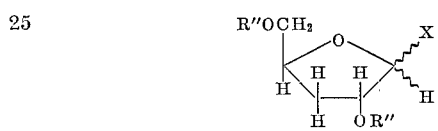

wherein R'' is lower alkanoyl, naphthoyl, benzoyl or substituted benzoyl and X is a halogen with a compound having the formula

wherein R' is the same as described above and Y is a lower alkyl, thereby producing a compound having the formula

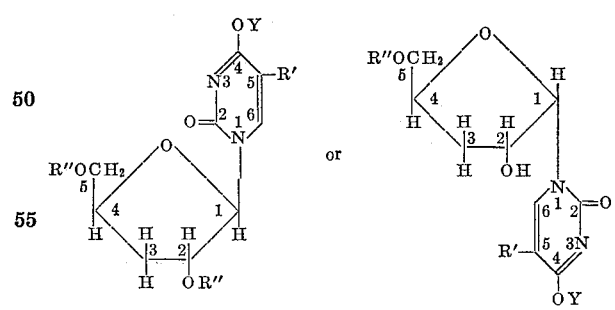

wherein R', R'', and Y are the same as above, and in Step B, solvolizing this compound to produce 1-(3-deoxy-D-ribofuranosyl)-substituted pyrimidines.

12. The method according to claim 11 wherein the solvolizing agents are an acidic and/or basic catalyst in an appropriate solvent, said acidic and basic catalyst being hydrochloric, hydrobromic, or sulfuric acid, alkali, alkaline earth, hydroxide or alkoxides, and said solvent is methanol or ethanol.

13. The method according to claim 11 wherein Step A is carried out in an inert solvent.

14. The method according to claim 13 wherein said inert solvent is methylene chloride.

15. The method of forming 5-fluoro-3-deoxyuridine which comprises treating 2,5-di-O-benzyl-3-deoxy-D-ribofuranosyl bromide with 2,4-dimethoxy-4-fluoro pyrimidine in the presence of methylene chloride at about 25° C. for about 80 hours thereby to produce 1-(2-5-di-O-benzyl - 3 - deoxy - D - ribofuranosyl) - 4 - methoxy - 5-fluoro-2(1-H)-pyrimidone, heating said ribofuranosyl pyrimidone in the presence of methanol and sodium hydroxide for a period of about 1.5 hours at about 60° C., thereby forming 5-fluoro-3-deoxyuridine.

References Cited
UNITED STATES PATENTS 3,277,077  10/1966  Holly et al. _____ 260—211.5

LEWIS GOTTS, Primary Examiner.

J. R. BROWN, Assistant Examiner.

UNITED STATES PATENT OFFICE
CERTIFICATE OF CORRECTION

Patent No. 3,346,561                                October 10, 1967

George E. Boxer et al.

It is hereby certified that error appears in the above numbered patent requiring correction and that the said Letters Patent should read as corrected below.

Column 12, line 18, for "wherein $R'''$ is lower alkanoyl, naphthoyl, benzoyl or sub-" read -- wherein R and $R'$ may be the same or different lower --.

Signed and sealed this 5th day of November 1968.

(SEAL)
Attest:

Edward M. Fletcher, Jr.
Attesting Officer

EDWARD J. BRENNER
Commissioner of Patents